United States Patent
Hu et al.

(10) Patent No.: US 11,441,788 B2
(45) Date of Patent: Sep. 13, 2022

(54) METHOD AND SYSTEM FOR DETERMINING HOT WATER USE BY USING TEMPERATURE GAP

(71) Applicant: Kyungdong Navien Co., Ltd., Gyeonggi-do (KR)

(72) Inventors: Changheoi Hu, Seoul (KR); Euneok Lee, Seoul (KR)

(73) Assignee: KYUNGDONG NAVIEN CO., LTD., Pyeongtaek-si (KR)

( * ) Notice: Subject to any disclaimer, the term of this patent is extended or adjusted under 35 U.S.C. 154(b) by 545 days.

(21) Appl. No.: 16/410,535

(22) Filed: May 13, 2019

(65) Prior Publication Data

US 2019/0346155 A1   Nov. 14, 2019

(30) Foreign Application Priority Data

May 11, 2018  (KR) .......................... 10-2018-0054512

(51) Int. Cl.
  *G01K 1/14*  (2021.01)
  *F24D 19/10*  (2006.01)

(52) U.S. Cl.
  CPC ........... *F24D 19/1063* (2013.01); *G01K 1/14* (2013.01); *G01K 2201/00* (2013.01)

(58) Field of Classification Search
  CPC ........ F24D 19/1063; F24D 3/00; F24D 17/00; F24D 2240/00; G01K 1/14; G01K 2201/00; F24F 11/02
  See application file for complete search history.

(56) References Cited

U.S. PATENT DOCUMENTS

| 4,750,452 A * | 6/1988 | Trihey ...................... F24H 8/00 431/1 |
| 5,056,712 A * | 10/1991 | Enck ................... G05D 23/1904 236/47 |
| 5,322,216 A * | 6/1994 | Wolter .................... F23N 1/082 219/475 |
| 6,819,563 B1* | 11/2004 | Chu .................... H05K 7/20736 165/104.33 |
| 2016/0047578 A1* | 2/2016 | Warren ................... F25B 13/00 62/115 |

(Continued)

FOREIGN PATENT DOCUMENTS

| CN | 103900249 A | * | 7/2014 |
| CN | 205980187 U | * | 2/2017 |

(Continued)

OTHER PUBLICATIONS

Office Action dated May 20, 2020 in Korean Application No. 10-2018-0054512.

*Primary Examiner* — Gail Kaplan Verbitsky

(74) *Attorney, Agent, or Firm* — Sughrue Mion, PLLC

(57) ABSTRACT

According to an aspect of the present disclosure, there is disclosed a method of determining the use of hot water performed in a system including a water heater and an air handler. The method includes: sensing a temperature of influent flowing into the water heater; sensing a temperature of effluent flowing out of the air handler; calculating a temperature difference between the temperature of the influent and the temperature of the effluent; and determining whether hot water is used by calculating whether the temperature difference is greater than a predetermined value.

9 Claims, 3 Drawing Sheets

(56) References Cited

U.S. PATENT DOCUMENTS

2016/0161928 A1* 6/2016 Bobker .................. G05B 15/02
                                                                                                                700/275
2016/0223481 A1* 8/2016 Rahman .............. G01M 99/002

FOREIGN PATENT DOCUMENTS

| | | | | |
|---|---|---|---|---|
| CN | 207006323 | U | * | 2/2018 |
| CN | 110470076 | A | * | 11/2019 |
| EP | 0895038 | A1 | * | 7/1999 |
| JP | H04309731 | A | * | 11/1982 |
| JP | H11501114 | A | * | 1/1999 |
| JP | 2900608 | B2 | * | 6/1999 |
| JP | 2002364901 | A | * | 12/2002 |
| JP | 3836796 | B2 | * | 10/2006 |
| JP | 2012042162 | A | * | 3/2012 |
| JP | 6987727 | B2 | * | 1/2022 |
| KR | 200404905 | Y1 | * | 12/2005 |
| KR | 10-1532620 | B1 | | 6/2015 |
| KR | 10-2017-0128850 | A | | 11/2017 |
| KR | 20210157608 | A | * | 10/2021 |
| WO | WO-2018193615 | A1 | * | 10/2018 |
| WO | WO-2019116599 | A1 | * | 6/2019 |

* cited by examiner

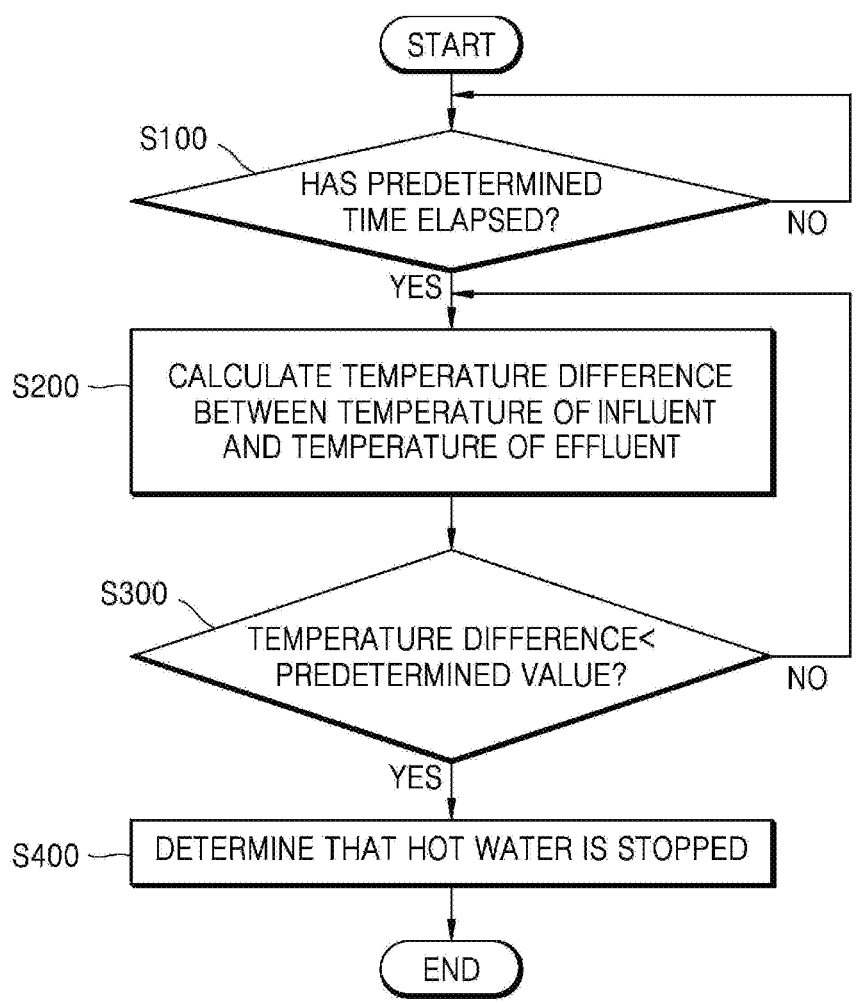

METHOD AND SYSTEM FOR DETERMINING HOT WATER USE BY USING TEMPERATURE GAP

CROSS-REFERENCE TO RELATED APPLICATION

This application claims the benefit of Korean Patent Application No. 10-2018-0054512, filed on May 11, 2018, in the Korean Intellectual Property Office, the disclosure of which is incorporated herein in its entirety by reference.

BACKGROUND

1. Field

The present disclosure relates to a method and system for determining the use of hot water using a temperature difference, and more particularly, to a method and system for determining the use of hot water using a temperature difference without using a flow switch.

2. Description of the Related Art

There is a system that includes a water heater and an air handler for heating and hot water. The water heater is an apparatus for providing hot water, and the air handler is an apparatus for circulating air for heating. The air handler may perform heating by receiving heated water from the water heater. In such a system, when the air handler uses hot water while heating using water heated in the water heater, hot water temperature and heating temperature may not reach set temperature. In particular, when the hot water temperature does not reach the set temperature, a user may recognize this as a problem. Therefore, it is necessary to determine whether the hot water is used during the heating of the air handler.

In such a system, it has been determined whether hot water is used through a flow switch. That is, when the flow switch is formed in a direct water pipe supplied to the water heater and a circulating flow rate determined through the flow switch is equal to or greater than a certain flow rate, it is determined that the use of hot water is started.

However, bubbles are frequently generated in the flow switch, and the inside of the flow switch may be clogged with foreign matter. Therefore, it is difficult to determine the use of hot water through the flow switch.

SUMMARY

The present disclosure provides a method and system capable of determining the use of hot water without using a flow switch.

The present disclosure is not limited to the above objectives, but other objectives not described herein may be clearly understood by those of ordinary skilled in the art from descriptions below.

According to an aspect of the present disclosure, there is provided a method of determining the use of hot water performed in a system including a water heater and an air handler, the method includes sensing a temperature of influent flowing into the water heater; sensing a temperature of effluent flowing out of the air handler; calculating a temperature difference between the temperature of the influent and the temperature of the effluent; and determining whether hot water is used by calculating whether the temperature difference is greater than a predetermined value.

According to an exemplary embodiment, the temperature of the influent and the temperature of the effluent may be sensed after a predetermined time has elapsed since the water heater was burned for heating.

According to an exemplary embodiment, the determining may include determining that hot water is being used when the temperature difference is greater than the predetermined value.

According to an exemplary embodiment, the determining may include determining that the use of hot water is stopped when the temperature difference between the sensed temperature of the influent and the sensed temperature of the effluent is less than the predetermined value.

According to another aspect of the present disclosure, there is provided a hot water usage determining system includes a water heater; a first temperature sensor configured to sense a temperature of influent flowing into the water heater; an air handler configured to receive heating water from the water heater for heating and to discharge effluent after heat exchange; a second temperature sensor configured to sense a temperature of the effluent, and a controller communicable with the first temperature sensor and the second temperature sensor; wherein the controller calculates a temperature difference between the sensed temperature of the influent and the sensed temperature of the effluent, and determines whether hot water is used by calculating whether the calculated temperature difference is greater than a predetermined value.

According to an exemplary embodiment, the second temperature sensor may be formed in a water outlet pipe through which the effluent flows.

According to an exemplary embodiment, the second temperature sensor may be formed in a water return pipe through which the effluent flows into the water heater again.

According to an exemplary embodiment, the controller may determine that hot water is being used when the calculated temperature difference is greater than the predetermined value.

According to an exemplary embodiment, the controller may determine that the use of hot water is stopped when the calculated temperature difference between the sensed temperature of the influent and the sensed temperature of the effluent is less than the predetermined value.

BRIEF DESCRIPTION OF THE DRAWINGS

These and/or other aspects will become apparent and more readily appreciated from the following description of the embodiments, taken in conjunction with the accompanying drawings in which:

FIG. 3 is a flowchart of a method of determining whether hot water is used in a case where the air handler shown in FIG. 1 is in operation and hot water is being used.

DETAILED DESCRIPTION

Figure 1:
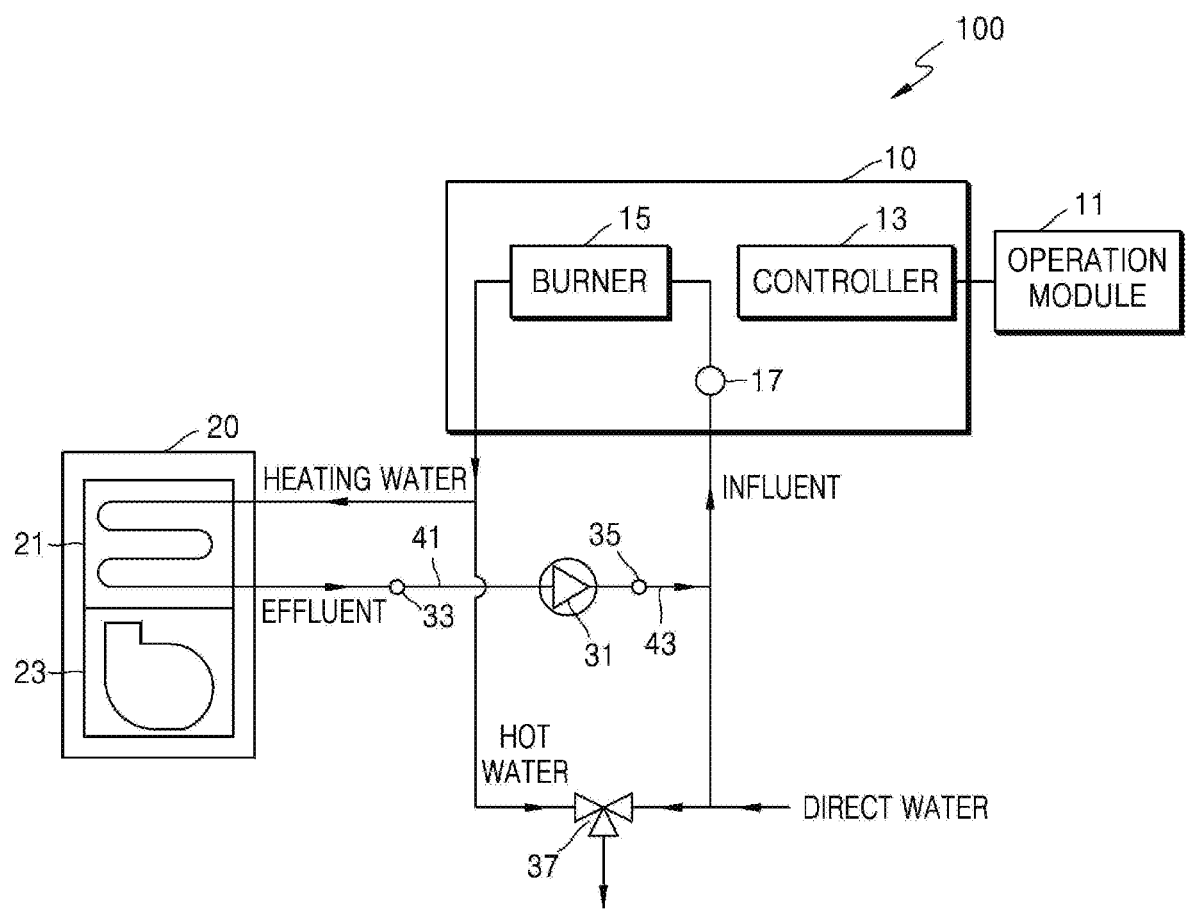
FIG. 1 is a configuration diagram showing a configuration of a hot water usage determining system according to an embodiment of the present disclosure.

The present disclosure may be variously modified and have various embodiments, so that specific embodiments will be illustrated in the drawings and described in the detailed description. However, this does not limit the present disclosure to specific embodiments, and it should be understood that the present disclosure covers all the modifications, equivalents and replacements included within the idea and technical scope of the present disclosure.

In describing the present disclosure, in the following description, a detailed explanation of known related technologies may be omitted to avoid unnecessarily obscuring the subject matter of the present disclosure. In addition, numeral figures (for example, 1, 2, and the like) used during describing the present disclosure are just identification symbols for distinguishing one element from another element.

Further, in the present disclosure, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the present disclosure mean a unit that processes at least one function or operation and this may be implemented by hardware or software such as a processor, a micro processor, a micro controller, a central processing unit (CPU), a graphics processing unit (GPU), an accelerated Processing unit (APU), a digital signal processor (DSP), an application specific integrated circuit (ASIC), and a field programmable gate array (FPGA) or a combination of hardware and software.

Moreover, it is intended to clarify that components in the present disclosure are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

Hereinafter, embodiments of the present disclosure will be described in detail in order.

FIG. 1 is a configuration diagram showing a configuration of a hot water usage determining system 100 according to an embodiment of the present disclosure.

Referring to FIG. 1, the hot water usage determining system 100 is a system capable of both hot water supply and heating. The hot water usage determining system 100 includes a water heater 10, an air handler 20, a pump 31, a second temperature sensor 33 or 35 for sensing a temperature of effluent flowing out of the air handler 20, and a mixing valve 37.

The water heater 10 includes an operation module 11, a controller 13, a burner 15, and a first temperature sensor 17. Although the controller 13 and the first temperature sensor 17 are formed inside the water heater 10, the controller 13 and the first temperature sensor 17 may be formed outside the water heater 10. For example, the controller 13 may be a separate device formed outside the water heater 10 if the controller 13 can communicate with the water heater 10, the first temperature sensor 17, and the second temperature sensor 33 or 35 by wire or wireless. The first temperature sensor 17 may be formed outside the water heater 10 if the temperature of the influent flowing into the water heater 10 can be sensed.

A user may select the hot water supply or the heating using the operation module 11. In addition, the user may simultaneously select the hot water supply and the heating by using the operation module 11. Further, the user may set desired hot water temperature or heating temperature by using the operation module 11.

The controller 13 controls operation of the water heater 10 in response to the operation module 11. For example, the controller 13 may control the burner 15 of the water heater 10 such that heated heating water is supplied to the air handler 20. In addition, the controller 13 may receive the temperature of the influent sensed by the first temperature sensor 17 in a data format. The influent is defined as water flowing into the water heater 10. The influent may be made by mixing direct water and the effluent flowing out of the air handler 20 through a water return pipe 43.

According to an embodiment, when the air handler 20 is not operating, the influent may be direct water. According to another embodiment, when the air handler 20 is operated and no direct water is introduced, the influent may be effluent.

A burner 15 heats water supplied under the control of a controller 11. The water supplied to the burner 15 is influent. The hot water heated by the burner 15 may be supplied to a user through the mixing valve 37.

The air handler 20 is a device capable of heating with heating water supplied from the water heater 10. The air handler 20 includes a heat exchanger 21 and a blower 23. The supplied heating water is supplied to the heat exchanger 21. Cold air is supplied through the blower 23. Warm air is discharged as the cold air is heat-exchanged with the heating water through the heat exchanger 21. Further, the heat exchanger 21 discharges effluent whose temperature is lower than the heating water to the outside. The low temperature effluent may be introduced into the water heater 10 through the water return pipe 43 again.

A second temperature sensor 33 for sensing a temperature of the effluent maybe formed in a water outlet pipe 41. According to an embodiment, a second temperature sensor 35 may be attached to the inside or the outside of the water return pipe 43. According to another embodiment, a plurality of temperature sensors may be formed in both the water outlet pipe 41 and the water return pipe 43 to sense the temperature of the effluent. Although the second temperature sensor 33 is formed in the water outlet pipe 41 outside the air handler 20 in this embodiment, the second temperature sensor 33 may be formed inside the air handler 20 to sense the temperature of the effluent.

It is necessary to determine whether hot water is used during the operation of the air handler 20. When the amount of heat for heating water required for the operation of the air handler 20 are greater than the amount of heat of the burner 15, the supply of heating and hot water may not be smooth. Therefore, it is important to determine whether hot water is used during heating and to control the water heater 10 and the air handler 20.

Figure 2:
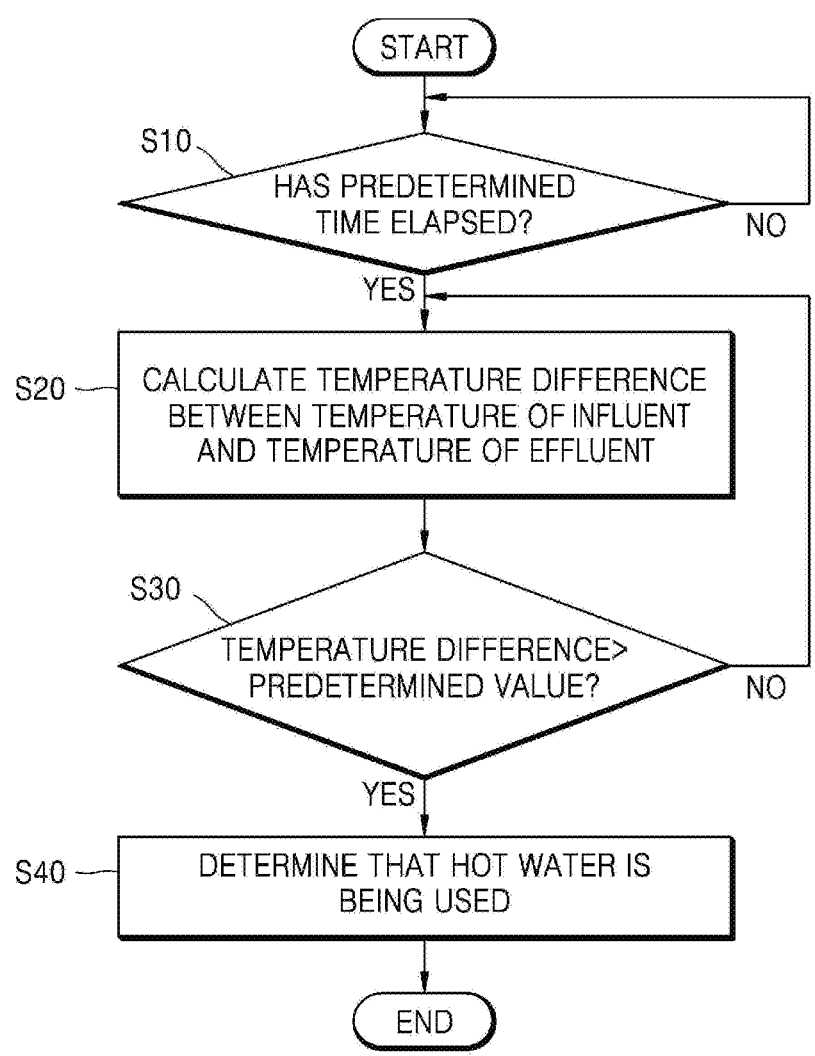
FIG. 2 is a flowchart of a method of determining whether hot water is used during operation of an air handler shown in FIG. 1.

FIG. 2 is a flowchart of a method of determining whether hot water is used during the operation of the air handler 20 shown in FIG. 1.

Referring to FIGS. 1 and 2, in operation S10, when the air handler 20 is in operation, the controller 13 determines whether a predetermined time has elapsed since the burner 15 of the water heater 10 was burned for heating. The predetermined time is a time that a user may arbitrarily set. By this operation, an error in which hot water temperature is erroneously determined during the initial operation may be prevented.

After the predetermined time, the first temperature sensor 17 may sense a temperature of influent flowing into the water heater 10. Also, the second temperature sensor 33 or 35 may sense a temperature of effluent of the air handler 20. The controller 13 may receive the temperature of the influent and the temperature of the effluent in a data format.

In operation S20, the controller 13 calculates a temperature difference between the temperature of the influent and the temperature of the effluent.

In operation S30, the controller 13 determines whether hot water is used by calculating whether the temperature difference is greater than a predetermined value. The predetermined value is a set value, which is a value that a user may set arbitrarily. This is to prevent an error due to the temperature loss of hot water caused by the pipe (e.g., 41 or 43) and deviation of the temperature sensor 17, 33, or 35.

In operation S40, when the temperature difference is greater than the predetermined value, the controller 13 determines that hot water is being used. When hot water is not used, the effluent of the air handler 20 is returned to the water heater 10 again. Therefore, the influent flowing into the water heater 10 is the effluent. However, when hot water is used, the influent flowing into the water heater 10 is water mixed with the effluent and direct water. Since the direct water flowing into the water heater 10 is cold water, the temperature of the influent flowing into the water heater 10 is lower than the temperature of water before the direct water is introduced. Therefore, the controller 13 may determine that hot water is being used because a temperature difference between the temperature of the influent when the direct water is introduced and the temperature of the effluent is greater than a temperature difference between the temperature of the influent when the direct water is not introduced and the temperature of the effluent.

The controller 13 may stop the operation of the air handler 20 and control the air handler 20 and the water heater 10 so as to discharge only hot water when heating and hot water cannot be simultaneously provided by the amount of heat of the burner 15.

FIG. 3 is a flowchart of a method of determining whether hot water is used in a case where the air handler 20 shown in FIG. 1 is in operation and hot water is being used.

Referring to FIGS. 1 and 3, in operation S100, when hot water is being used and the air handler 20 is in operation, the controller 13 determines whether a predetermined time has elapsed since the burner 15 of the water heater 10 was burned.

After the predetermined time, the first temperature sensor 17 may sense a temperature of influent flowing into the water heater 10. Also, the second temperature sensor 33 or 35 may sense a temperature of effluent of the air handler 20. The controller 13 may receive the temperature of the influent and the temperature of the effluent in a data format.

In operation S200, the controller 13 calculates a temperature difference between the temperature of the influent and the temperature of the effluent.

In operation S300, the controller 13 determines whether hot water is used by calculating whether the temperature difference is greater than a predetermined value.

In operation S400, when the temperature difference is less than the predetermined value, the controller 13 determines that the use of hot water of the water heater 10 is stopped.

When the use of hot water is stopped during heating, the water heater 10 no longer receives direct water. Therefore, a temperature difference between the temperature of the influent and the temperature of the effluent when the use of hot water is stopped during heating is less than a temperature difference between the temperature of the influent and the temperature of the effluent when the heating and the use of hot water are simultaneously performed. Since direct water is introduced when the heating and the use of hot water are simultaneously performed, the temperature difference between the temperature of the influent and the temperature of the effluent is relatively great.

The controller 13 may be able to supply more heating water to the air handler 20 for heating to user's desired temperature.

The hot water usage determining system 100 according to the inventive concept of the present disclosure may determine the use of hot water by using a temperature difference between the temperature of the influent of the water heater 10 and the temperature of the effluent of the air handler 20 without using a flow switch, thereby solving an error problem according to determination of the flow rate switch and saving installation cost of the flow rate switch.

Hereinabove, the inventive concept of the present disclosure has been described with reference to the preferred embodiments of the present disclosure. However, it will be appreciated by those skilled in the art that various modifications and changes of the present disclosure can be made without departing from the scope of the inventive concept of the present disclosure which are defined in the appended claims and their equivalents.

What is claimed is:

1. A method of determining the use of hot water performed in a system including a water heater and an air handler, the method comprising:
   sensing a temperature of influent flowing into the water heater;
   sensing a temperature of effluent flowing out of the air handler;
   calculating a temperature difference between the temperature of the influent and the temperature of the effluent; and
   determining whether hot water is used by calculating whether the temperature difference is greater than a predetermined value.

2. The method of claim 1, wherein the temperature of the influent and the temperature of the effluent are sensed after a predetermined time has elapsed since the water heater was burned for heating.

3. The method of claim 1, wherein the determining comprises:
   determining that hot water is being used when the temperature difference is greater than the predetermined value.

4. The method of claim 3, wherein the determining comprises:
   determining that the use of hot water is stopped when the temperature difference between the sensed temperature of the influent and the sensed temperature of the effluent is less than the predetermined value.

5. A hot water usage determining system comprising:
   a water heater;
   a first temperature sensor configured to sense a temperature of influent flowing into the water heater;
   an air handler configured to receive heating water from the water heater for heating and to discharge effluent after heat exchange;
   a second temperature sensor configured to sense a temperature of the effluent, and
   a controller communicable with the first temperature sensor and the second temperature sensor;

wherein the controller calculates a temperature difference between the sensed temperature of the influent and the sensed temperature of the effluent, and determines whether hot water is used by calculating whether the calculated temperature difference is greater than a predetermined value.

6. The hot water usage determining system of claim 5, wherein the second temperature sensor is formed in a water outlet pipe through which the effluent flows.

7. The hot water usage determining system of claim 5, wherein the second temperature sensor is formed in a water return pipe through which the effluent flows into the water heater again.

8. The hot water usage determining system of claim 5, wherein the controller determines that hot water is being used when the calculated temperature difference is greater than the predetermined value.

9. The hot water usage determining system of claim 8, wherein the controller determines that the use of hot water is stopped when the calculated temperature difference between the sensed temperature of the influent and the sensed temperature of the effluent is less than the predetermined value.

\* \* \* \* \*

UNITED STATES PATENT AND TRADEMARK OFFICE
CERTIFICATE OF CORRECTION

| | | |
|---|---|---|
| PATENT NO. | : 11,441,788 B2 | Page 1 of 1 |
| APPLICATION NO. | : 16/410535 | |
| DATED | : September 13, 2022 | |
| INVENTOR(S) | : Changheoi Hu and Euneok Lee | |

It is certified that error appears in the above-identified patent and that said Letters Patent is hereby corrected as shown below:

On the Title Page

Title and in the Specification, Column 1, Lines 1-3: Delete "METHOD AND SYSTEM FOR DETERMINING HOT WATER USE BY USING TEMPERATURE GAP" and replace with -- METHOD AND SYSTEM FOR DETERMINING USE OF HOT WATER USING TEMPERATURE DIFFERENCE --

Signed and Sealed this
Thirteenth Day of December, 2022

Katherine Kelly Vidal
*Director of the United States Patent and Trademark Office*